United States Patent [19]

Panico

[11] Patent Number: 4,495,040
[45] Date of Patent: Jan. 22, 1985

[54] PHOTOMAGNETIC CATALYSIS PROCESS

[75] Inventor: C. Richard Panico, Medford, Mass.

[73] Assignee: Xenon Corporation, Wilmington, Mass.

[21] Appl. No.: 493,779

[22] Filed: May 12, 1983

Related U.S. Application Data

[63] Continuation-in-part of Ser. No. 491,016, May 3, 1983, and a continuation-in-part of Ser. No. 401,318, Jul. 23, 1982, Pat. No. 4,443,533.

[51] Int. Cl.³ .......................... B01J 19/12; B01J 19/24
[52] U.S. Cl. ............................... 204/155; 204/159.22; 422/186; 430/311
[58] Field of Search ......... 204/155, 157.1 R, 159.1 E; 427/47; 430/311, 313, 319; 422/186

[56] References Cited

U.S. PATENT DOCUMENTS

| | | | |
|---|---|---|---|
| 3,929,433 | 12/1975 | Lucero | 204/155 |
| 4,115,078 | 9/1978 | Janner et al. | 204/155 |
| 4,167,669 | 9/1979 | Panico | 250/341 |
| 4,224,525 | 9/1980 | Phillips et al. | 204/155 |
| 4,448,657 | 5/1984 | Turro | 204/155 |

OTHER PUBLICATIONS

Turro et al., JACS, 100 (1978) pp. 7432–7434.
Turro et al., JACS, 102 (1978) pp. 7391–7393.
Morri et al., Kogyo Kagaku Zasshi [Industrial Chem. Magazine], vol. 73, No. 4 (1970) pp. 815–818—Translation.

*Primary Examiner*—Howard S. Williams

[57] ABSTRACT

The method of catalyzing a chemical reaction in a substance of a type in which a chemical reaction can be catalyzed by the combined effects of a magnetic field and electromagnetic radiation. Electromagnetic radiation and a pulsed magnetic field of sufficient (and greater than ambient) strength is applied to the substance to catalyze the chemical reaction, the magnetic field being other than that of the electromagnetic radiation.

30 Claims, 15 Drawing Figures

PHOTOMAGNETIC CATALYSIS PROCESS

This application is a continuation-in-part of my pending application entitled "Photomagnetic Curing of Photoresists", filed on May 3, 1983 Ser. No. 491,016 and of my pending application Ser. No. 401,318 entitled "Photoresist Curing Method", filed on July 23, 1982 now U.S. Pat. No. 4,443,533.

BACKGROUND OF THE INVENTION

This invention relates to catalyzing or effectuating a chemical reaction in a substance by application of a magnetic field, preferably a magnetic field combined with electromagnetic radiation.

It is known in the art that chemical reactions such as polymerization can be catalyzed by application of electromagnetic radiation, e.g., ultraviolet light. Typically the light is applied continuously for relatively long periods of time, e.g., thirty minutes. Some efforts have been made to use flash lamps for this purpose, as described in my U.S. Pat. Nos. 3,782,889 and 4,167,669.

SUMMARY OF THE INVENTION

I have discovered that a magnetic field can be used to catalyze chemical reactions (e.g., polymerization) in a substance. In preferred embodiments, the magnetic field is combined with electromagnetic radiation; the magnetic field and radiation are applied, at least for a time, simultaneously; the radiation is provided by discharge of a flash lamp and has components in the ultraviolet spectrum; both the magnetic field and radiation are time varying (e.g., a plurality of applied pulses); the average magnetic induction is on the same order as or less than the ambient level provided by the earth's magnetic field, whereas the peak induction is much greater (e.g., greater than 25 gauss); the peak level of radiation is 0.1 joules/cm$^2$ at the surface of the substance; the substance is a carbon composite, a photoresist (e.g., a novolak-resin-based photoresist coating on a semiconductor wafer), an opaque material, a liquid drawn through a pipe, the plastic wall of a pipe (or the plastic insulation on a cable), a coating on a sheet, or a material that would require exposure to deep-UV radiation if catalyzed by exposure to continuous radiation; the radiation is provided by a flash lamp (e.g., one to which a potential of greater than 4000 volts is applied); the flash lamp can be wound in a helix, in which case the substance can be moved through the interior of the helix, or the lamp can be wound in a flat spiral (e.g., one with circular windings), in which case the substance can be moved in a plane generally parallel to and spaced from the lamp; the magnetic field can be generated by a separate wound electrical conductor (e.g., a wire spiral or helix).

The invention provides greatly improved catalysis of chemical reactions. For example, in polymerizing (or curing) photoresists, the invention provides greatly improved resistance of the cured photoresist to ion implantation, plasma etching, thermal baking and other treatments given to semiconductor wafers; the technique provides greater hardness and greatly elevated flow temperatures for the cured photoresist; it has the additional advantages of reduced curing time, greater curing uniformity across the wafer, and greater curing reliability. The invention has also been applied to curing thermoset resins, i.e., ones normally cured in ovens; excellent curing has been achieved in a tiny fraction of the time normally required using ovens.

Other advantages and features of the invention will be apparent from the following description of preferred embodiments and from the claims.

DESCRIPTION OF THE PREFERRED EMBODIMENTS

Drawings

DESCRIPTION

Referring to FIGS. 12–15, there are shown three embodiments in which wire coils 2, which generate a magnetic field, are combined with flash lamps 4, which generate electromagnetic radiation (e.g., ultraviolet light) and augment the magnetic field. The current flowing through the lamp and coils is in pulses, thereby producing a pulsed magnetic field and pulsed radiation.

Figure 12:
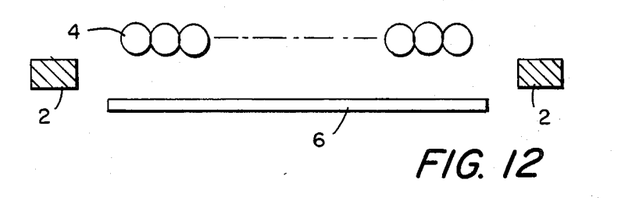
FIG. 12 is a cross-sectional view of a fourth preferred embodiment.

In FIG. 12 the field and radiation are applied to a planar object 5 (e.g., a graphite-epoxy composite or the photoresist coating on a semiconductor wafer).

Figure 13:
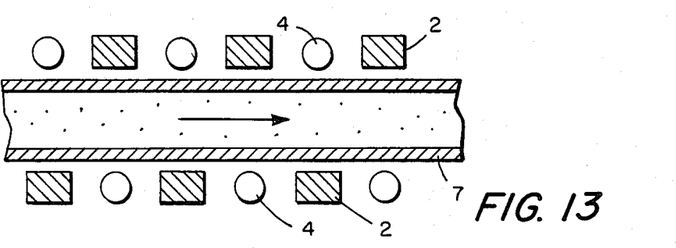
FIG. 13 is a cross-sectional view of a fifth preferred embodiment.
Figure 15:
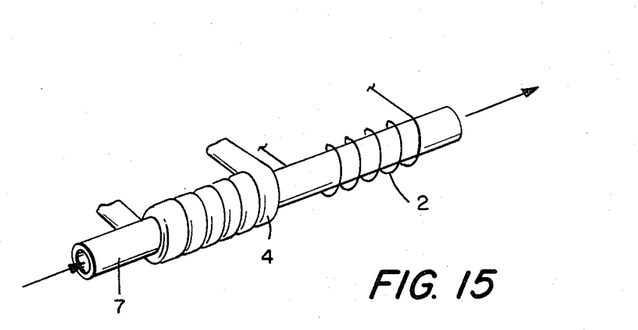
FIG. 15 is a perspective view of a seventh preferred embodiment.

In FIGS. 13 and 15, the coils and lamp are helical and are wrapped around a pipe 7 (e.g., with a transparent quartz wall), and the field and radiation are applied to liquid industrial chemicals flowing through the pipe. In FIG. 13 the turns of the lamp and wire coils are interspersed, whereas in FIG. 15 they are separated.

Figure 14:
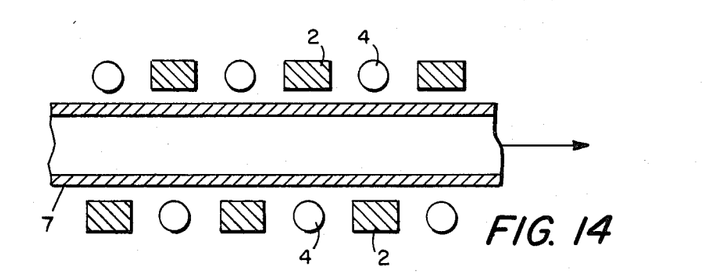
FIG. 14 is a cross-sectional view of a sixth preferred embodiment.

In FIG. 14, the lamp and coils are also helical, but the object receiving the catalyzing field is a solid tubular member (e.g., the insulation on a wire cable or the wall of a plastic pipe).

Actual tests of the invention have been conducted in several applications. One such application has been curing photoresist materials used in the manufacture of integrated circuits.

Some background in the photoresist process can be found in my copending application entitled "Photomagnetic Curing of Photoresists" filed on May 3, 1983, Ser. No. 491,016.

EXAMPLE 1

FIGS. 1–7 relate to the equipment and process used to test the invention for curing a positive photoresist of the type requiring exposure to deep-UV light when curing is done by long exposure to continuous radiation (hereinafter a "deep-UV photoresist").

Figure 1:
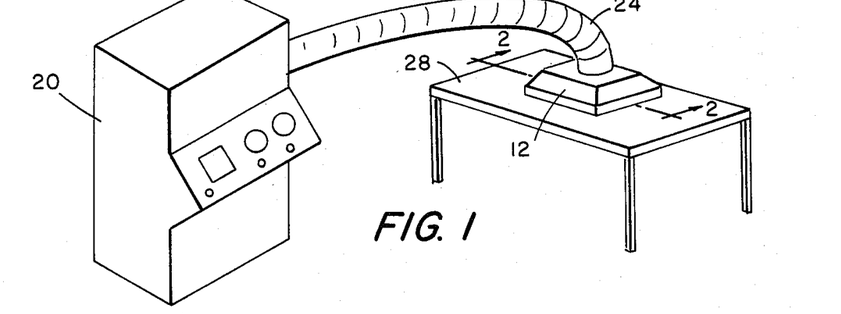
FIG. 1 is a perspective, somewhat diagrammatic, view of a first preferred embodiment.
Figure 2:
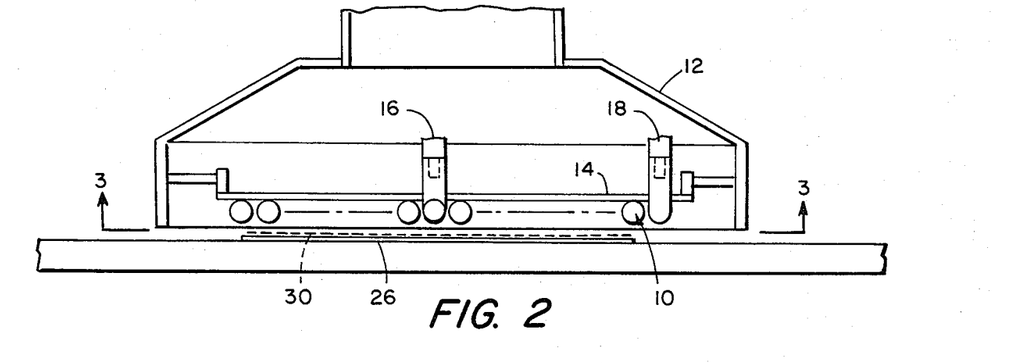
FIG. 2 is a cross-sectional view taken along 2—2 in FIG. 1.
Figures 3, 4:
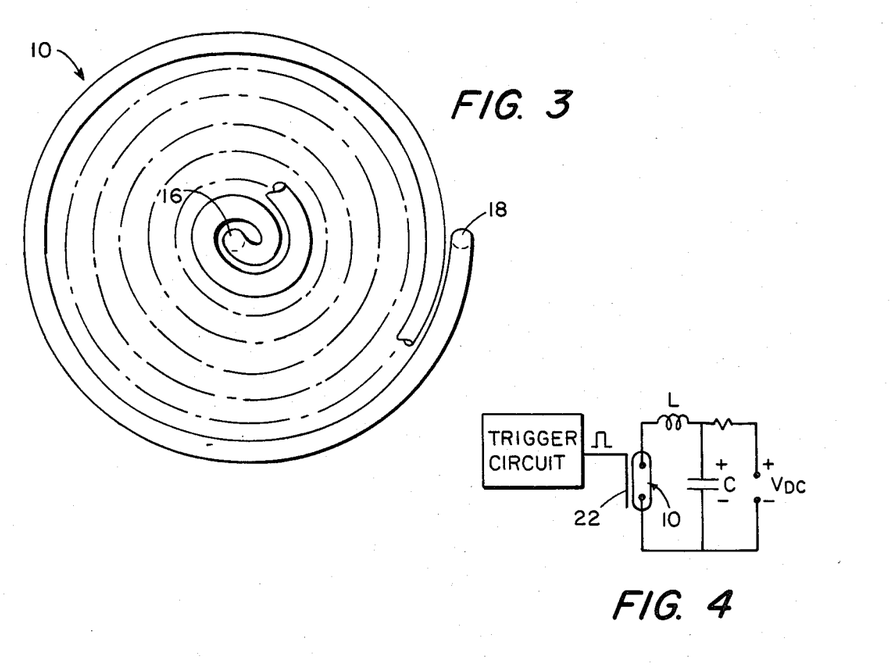
FIG. 3 is a partial plan view looking up along 3—3 in FIG. 2, showing the flash lamp.
FIG. 4 is a simplified schematic of the electrical circuit driving the flash tube.

Referring to FIGS. 1 to 3, there is shown a flash tube (or flash discharge arc lamp) 10 consisting of an elongated quartz (ultraviolet free, Germasil) tube filled with Xenon gas, wound in a flat spiral, and supported within housing 12 on the underside of reflector 14. Electrodes 16, 18 at the ends of the tube are connected via cables (not shown) to an electronic control unit 20 (Xenon RCS-7000, manufactured by Xenon Corporation, Wilmington, Mass.). A trigger wire (nickel) 22 is wrapped around the exterior of the lamp 10 and is also connected to control unit 20. Air hose 24, which also carries the cables to the lamp, is connected between control unit 20 and lamp housing 12. Air supplied through the hose passes through holes (not shown) in reflector 14, to cool flash tube 10.

Beneath lamp 10 there is positioned a semiconductor wafer 26, which is supported on the upper surface of work table 28 (which, in large scale operations, would probably be replaced by a moving conveyor carrying a succession of wafers). The wafer has a photoresist layer 30 on its upper surface.

Control unit 20 provides a DC voltage of greater than 5000 volts across flash tube electrodes 16, 18. A simplified schematic of the control unit and flash tube is shown in FIG. 4. A storage capacitor C is connected in parallel with the flash tube, and an inductor L is connected in series. A trigger circuit (which includes a capacitor discharging through a transformer) generates a succession of high-voltage (approximately 30,000 V) pulses, which are supplied to trigger wire 22 wrapped around flash tube 10.

Figure 5:
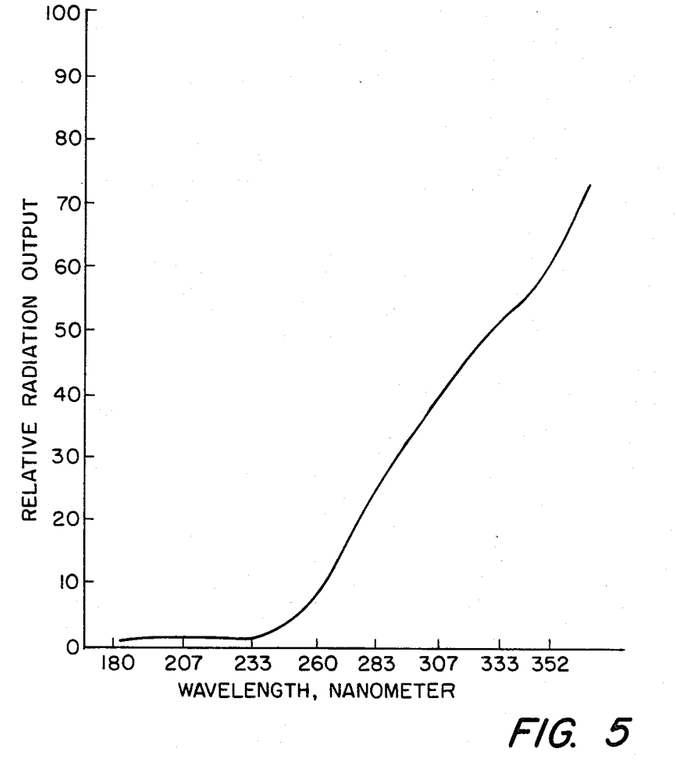
FIG. 5 is a graphical representation of the spectral content of the radiation emitted by the flash tube of said FIG. 1 embodiment.
Figure 6:
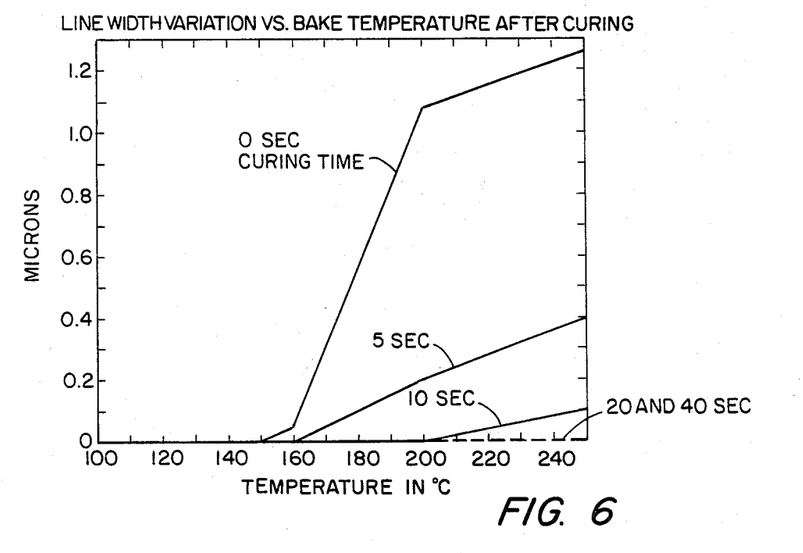
FIGS. 6 and 7 are graphs presenting results of tests conducted on wafers cured with the embodiment of FIG. 1.
Figure 7:
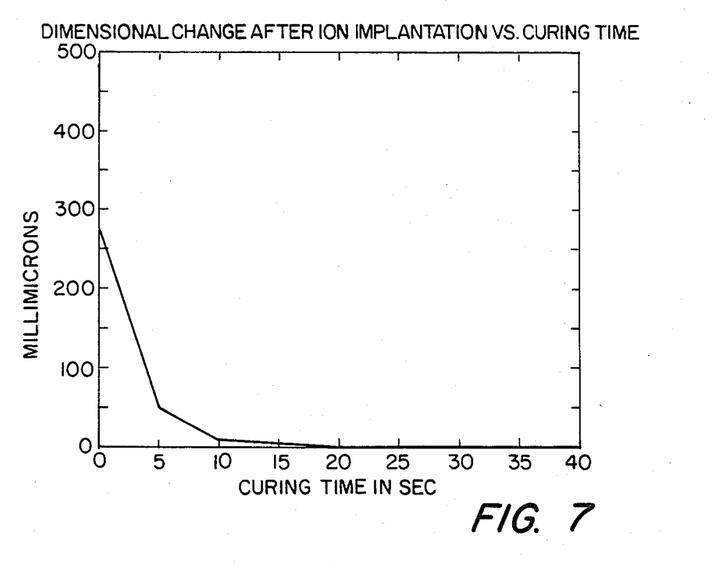

Unoxidized wafers (4 inch diameter) were coated with Kodak 820 positive resist, a deep-UV photoresist. The resist film had a thickness of 12,700 Angstroms (plus or minus 200 Angstroms). All wafers were exposed identically to a mask that included lines with 1.5 micron width as well as other dimensions as large as 0.25 inches. Conventional developing steps were performed to remove illuminated portions of the photoresist. The wafers were then cured by exposing them under flash tube 10 for periods of time ranging from 5 to 40 seconds. The flash tube was spaced a distance of 5.0 cm from the upper surface of the wafer. The spectral output of the tube was as shown in FIG. 5, with negligible energy in the deep-UV range of wavelengths below 260 nanometers. No component of the radiation below 260 nanometers had a relative output greater than 20%. There was also little radiation at wavelengths below 300 nanometers, which is another upper boundary sometimes used to define the deep-UV range. All components below 300 nanometers had less than about 40% relative output. Radiation was predominantly in the wavelength range above 300 nanometers, the so-called near-UV range. The flash tube and control unit had the following characteristics:

| | |
|---|---|
| tube arc length | 90 inches |
| tube internal diameter | 7 mm |
| tube external diameter | 9 mm |
| shape of tube | 7-turn spiral |
| diameter D of spiral | approximately 7 inches |
| gas filling tube | Xenon at 250 mm pressure |
| current density in tube | 850 amps/cm$^2$ |
| pulse length | 240 microseconds |
| pulse rate | 10 pulses per second |
| potential | 9500 volts |
| capacitance, C | 12 microfarads |
| inductance, L | 675 microhenries |

Pulse length was measured between the points at which the light output is one-third of the maximum light output.

After curing was completed some of the wafers were baked at temperatures varying between 150 and 250 degrees C. for thirty minutes, to determine the resistance of the cured photoresist to elevated temperatures. After baking the photoresist patterns were measured for deviations in line width. Plots of the variation in line width (microns variation in width) versus bake temperature are given in FIG. 5 for an uncured wafer and for cured wafers with four different curing times (5, 10, 20, and 40 seconds). Wafers cured under the flash tube for 20 and 40 seconds showed no variation in line width even at bake temperatures as high as 250 degrees C. The wafer cured for 40 seconds was then rebaked in a 300 degree C. oven for an additional 30 minutes, and rechecked for variation in line width. Again, no variation was found.

Another group of wafers was exposed to high dose ion implantation consisting of an arsenic implant at 150 KeV with a dose of 5E 15 on an implanter without wafer cooling. After implantation the resist patterns were measured for variation in line width. Uncured wafers suffered a variation of about 275 millimicrons, whereas wafers cured for 10 seconds or longer showed almost no variation. But the principal impairment caused by ion implantation was not variation in line width but loss of surface integrity. The resist patterns on the uncured wafers were excessively bubbled, reticulated, and cracked. This was also true to some degree of wafers cured for only 5 or 10 seconds. The wafer cured for 20 seconds showed a significant reduction in such characteristics, and had only a slight amount of edge rounding. The wafer cured for 40 seconds showed no such characteristics and no edge rounding.

EXAMPLE 2

Another test of the invention as applied to curing a photoresist is described in FIGS. 8, 9, and 10 and in the following paragraphs.

Figure 8:
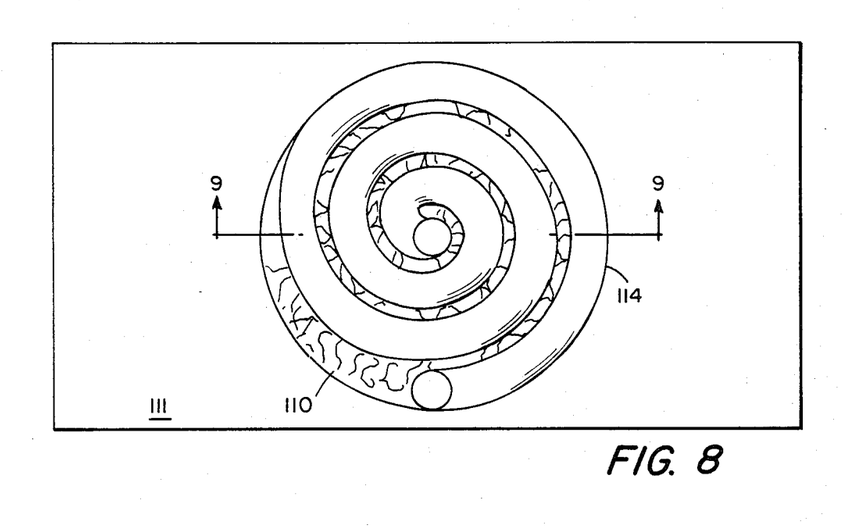
FIGS. 8, 9, and 10 show a second preferred embodiment (described in my pending application Ser. No. 401,318, which is hereby incorporated by reference).
Figure 9:
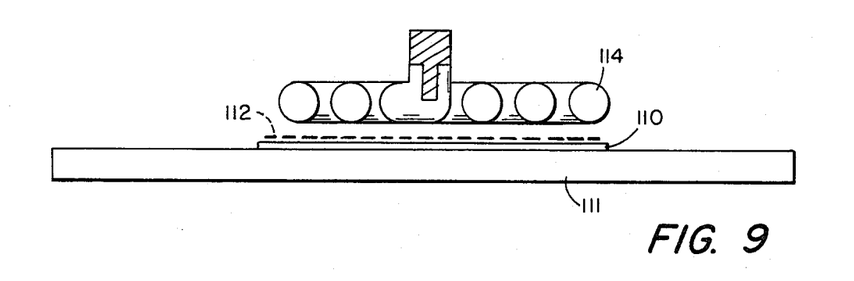
Figure 10:
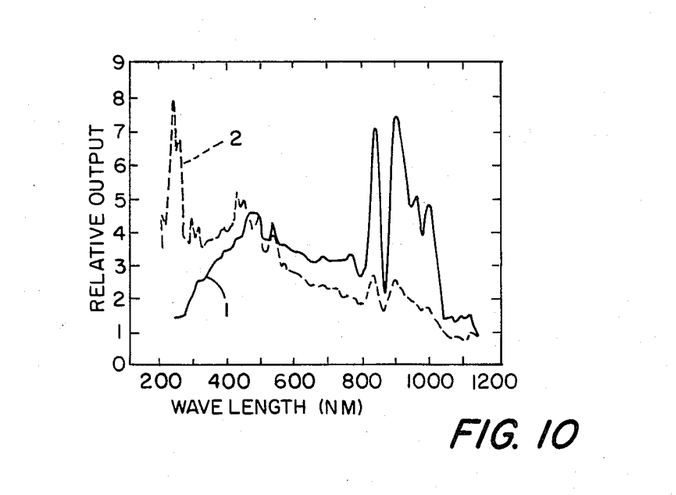

FIGS. 8, 9, and 10 describe a further alternative embodiment, which is the subject of my pending application Ser. No. 401,318 (which is hereby incorporated by reference). FIG. 8 and FIG. 9 are plan and cross-sectional views of the post development cure. Wafer 110 is positioned on work table 111 with developed photoresist coating 112 facing flash lamp 114. Flash lamp 114 is flashed to effect the post development cure. The details of the method are best explained by example.

Semiconductor wafer 10 was 3 inches in diameter and carried a developed photoresist coating 1.5 microns thick of AZ-5000 a positive photoresist of AZ Photoresist Products, Somerville, N.J. Flash lamp parameters:

| | |
|---|---|
| arc length | 16 inches |
| bore | 7 mm |
| outside diameter | 9 mm |
| shape | 3-turn sprial |

-continued

| | |
|---|---|
| spiral diameter | 3 inches |
| fill | Xenon at 250 mm pressure |
| current density | 1560 amps/cm$^2$ |
| pulse length | 140 microseconds |
| pulse rate | 7 pulses per second |
| voltage | 3200 volts |
| capacitance | 32 microfarads |
| inductance | 100 microhenries |

In this example, the spacing between the surface of photoresist 112 and the outside of the lamp envelope was 7.0 mm. The full time of exposure was two seconds. The spectral distribution of the lamp output was substantially that shown in solid curve 1 of FIG. 10. The photoresist was completely cured.

The parameters given in the above example are subject to considerable variation. Lamps have been made in a zig-zag (serpentine) and other shapes. Lamps may be operated in series, in parallel or in a combination. The spacing between the lamp and the photoresist is preferably less than 10.0 cm and most preferably less than 6.0 cm for efficiency. The pulse rate is preferably greater than one pulse per second. The electrical current density in the lamp is preferably greater than 400 amperes/sec$^2$ and preferably less than 2000 amperes/cm$^2$. The pulse length, fill pressure and gas mixture are important in obtaining the desired spectral output. Variations can be used as long as they do not cause substantial changes in the spectral output.

In the sample above, there was negligible loss in resolution and after the integrated circuits had been formed, the photoresist removed cleanly in the removal step.

FIG. 10 depicts the spectral distribution curve (curve 1) that has produced the unexpected results. It shows high output in the 800 to 1100 nanometer wavelength region. Curve 2 shows the deep-UV spectral distribution that the prior art regarded as necessary to cure positive photoresists.

EXAMPLE 3

A graphite-epoxy composite material (manufactured by Fiberite Corporation) of the type used for high-strength, light weight structural elements was cured using the apparatus of FIGS. 1-5. Approximately twelve 2 inch by 2 inch layers of the composite were stacked together and vacuum compressed, to give interlayer adhesion. The compressed stack was approximately 1/10 inch thick. The composite was positioned about 5.0 cm from the lamp and exposed for approximately five minutes, at the end of which period curing was complete. To achieve the same curing by the conventional baking process would take several hours. The spectral output of the tube was as shown in FIG. 5, with negligible energy in the deep-UV range of wavelengths below 260 nanometers. The flash tube and control unit had the following characteristics:

| | |
|---|---|
| tube arc length | 90 inches |
| tube internal diameter | 7 mm |
| tube external diameter | 9 mm |
| shape of tube | 7-turn spiral |
| diameter D of spiral | approximately 7 inches |
| gas filling tube | Xenon at 250 mm pressure |
| current density in tube | 850 amps/cm$^2$ |
| pulse length | 240 microseconds |
| pulse rate | 10 pulses per second |
| potential | 9500 volts |
| capacitance, C | 12 microfarads |
| inductance, L | 675 microhenries |

Pulse length was measured between the points at which the light output is one-third of the maximum light output.

EXAMPLE 4

A thermoset insulating varnish (General Electric 702C Solventless Varnish), an unsaturated polyester resin, of the type used to impregnate DC traction motors was cured using the apparatus of FIGS. 1-5. Approximately one teaspoonful of the varnish was spread onto a glass slide to a thickness of approximately 1/16 inch. The slide was positioned approximately 5.0 cm beneath the flash lamp and exposed for 120 seconds, at the end of which period curing was complete. To achieve the same curing by the conventional baking process would take 4 to 6 hours. The spectral output of the tube was as shown in FIG. 5, with negligible energy in the deep-UV range of wavelengths below 260 nanometers. The flash tube and control unit had the following characteristics:

| | |
|---|---|
| tube arc length | 90 inches |
| tube internal diameter | 7 mm |
| tube external diameter | 9 mm |
| shape of tube | 7-turn spiral |
| diameter D of spiral | approximately 7 inches |
| gas filling tube | Xenon at 250 mm pressure |
| current density in tube | 850 amps/cm$^2$ |
| pulse length | 240 microseconds |
| pulse rate | 10 pulses per second |
| potential | 9500 volts |
| capacitance, C | 12 microfarads |
| inductance, L | 675 microhenries |

Pulse length was measured between the points at which the light output is one-third of the maximum light output.

Figure 11:
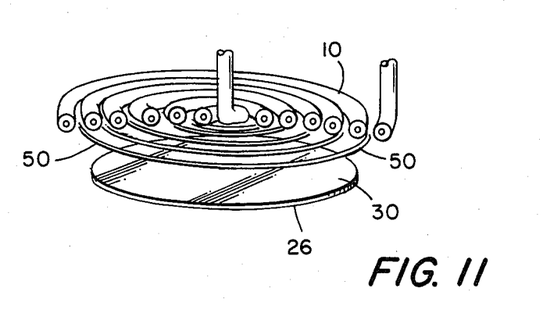
FIG. 11 is a perspective, somewhat diagrammatic, view of a third preferred embodiment.

Another preferred embodiment is shown in FIG. 11, wherein a wire 50 wound in a spiral, positioned beneath the flash tube, and connected electrically in series therewith (so that current passing through the lamp also passes through the wire) is provided to strengthen the magnetic field.

It is believed that the improved catalysis (e.g., curing) achieved by the invention is due to the high magnetic field generated in conjunction with the light output. It is estimated that the magnetic field produced has a peak magnetic induction of the order of 75 gauss at the photoresist. A peak magnetic induction of at least 25 gauss is preferable. The magnetic field has an average magnetic induction of only 0.15 gauss, a level low enough not to damage electrical components (e.g., integrated circuits, including those already formed on a semiconductor wafer being treated).

The magnetic field is believed to work in conjunction with the light, e.g., to promote the growth of larger polymerized molecules, and thus, in the photoresist application, greater hardness and higher flow temperature. It is thought that this is achieved by virtue of the magnetic field acting to reduce the influence of competitive mechanisms that tend, in the absence of the field, to stop the polymerization process. One way in which the light and magnetic field may cooperate is as follows. The light raises the photoresist molecules to a first elevated energy state in which they are made paramagnetic. Then, the magnetic field raises the molecules to an even higher energy state. The result is that the molecules remain in an elevated energy state for a longer time interval and thus there is more time for them to combine and form larger molecules.

The magnetic field has an advantage over light in that it can deeply penetrate opaque materials such as photoresists. Measurements of photoresist layers cured with the magnetic field show evidence of very deep curing.

To enhance the magnetic field, the flash tube has a long length per unit area of lamp coverage (achieved in some preferred embodiments by winding the elongated tube in a spiral with little separation between the revolutions), is positioned close to the photoresist layer, and is driven at the high voltages and currents.

Given that the strength of the magnetic field increases with the magnitude of the current flowing through the tube, it is generally desirable to choose lamp configurations that enhance current flow by reducing lamp impedance. But it appears that a serpentine shape lamp, in which adjacent tube portions would have oppositely directed current flow and in which there would therefore be reduced lamp impedance, provides a less powerful magnetic field than the spiral design of the preferred embodiment, owing (it is believed) to a cancellation effect on magnetic fields generated by adjacent tube portions. The serpentine tube may, however, be advantageous in some applications.

An advantage of generating the magnetic field and light using an elongated tube bent into a wide area configuration (e.g., a flat spiral), versus using an ordinary straight tube (and reflector for spreading out the light), is that the magnetic field is stronger and more uniform at the photoresist layer. Another advantage of that configuration is that the lamp power per unit tube length can be kept lower, thereby resulting in much longer tube life.

OTHER EMBODIMENTS

Other embodiments are within the scope of the following claims. For example, it may be possible to achieve catalysis solely with a magnetic field. It may be possible to use a continuous magnetic field in combination with a pulsed light. It may also be possible to use continuous light. Different shape flash tubes, e.g., a non circular spiral, may be used; preferably the lamp tube should be wound in a configuration in which adjacent tube portions have current flowing in the same direction.

What is claimed is:

1. The method of catalyzing a chemical reaction in a substance of a type in which a chemical reaction can be catalyzed by the combined effects of a magnetic field and electromagnetic radiation, said method comprising the step of applying to said substance electromagnetic radiation and a pulsed magnetic field of sufficient (and greater than ambient) strength to catalyze said chemical reaction, said magnetic field being generated by means other than a discharge through a straight or flat serpentine flash lamp, and said magnetic field being other than that of said electromagnetic radiation.

2. The method of claim 1 wherein said magnetic field and electromagnetic radiation are applied, at least for a time, simultaneously.

3. The method of claim 1 wherein said electromagnetic radiation is the discharge from a flash lamp.

4. The method of claim 3 wherein said electromagnetic radiation includes components in the ultraviolet spectrum.

5. The method of claim 1 wherein said magnetic field and electromagnetic radiation are time varying and the peak magnetic induction exceeds ambient levels.

6. The method of claim 5 wherein the average magnetic induction is on the same order of or less than ambient levels.

7. The method of claim 1 wherein said electromagnetic radiation is pulsed from one level to another.

8. The method of claim 1 wherein said electromagnetic radiation has a peak intensity greater than 0.1 joules/cm$^2$ at the surface of said substance.

9. The method of claim 8 wherein said magnetic field has a peak magnetic induction greater than 25 gauss at the surface of said substance.

10. The method of claim 1 wherein said catalyzed chemical reaction is polymerization.

11. The method of claim 10 wherein said substance is unsaturated monomers.

12. The method of claim 10 wherein said electromagnetic radiation is provided by one or more discharges from a flash lamp and wherein said substance is of a type requiring exposure to deep-UV radiation to produce said polymerization when radiation is applied continuously.

13. The method of claim 1 wherein said substance consists of a carbon composite structure.

14. The method of claim 1 wherein said substance consists of an opaque material so thick that said chemical reaction cannot be catalyzed throughout its depth by exposure only to electromagnetic radiation.

15. The method of claim 1 wherein said substance is moved with respect to said magnetic field and electromagnetic radiation while said chemical reaction is being catalyzed.

16. The method of claim 15 wherein said substance consists of a liquid drawn through a pipe which is exposed to said magnetic field and electromagnetic radiation.

17. The method of claim 15 wherein said substance consists of the plastic wall of a pipe drawn past said magnetic field and electromagnetic radiation.

18. The method of claim 15 wherein said substance consists of a coating on a continuously moving sheet.

19. The method of claim 1 wherein said substance consists of a photoresist.

20. The method of claim 19 wherein said photoresist consists of a coating on the exposed surface of a semiconductor wafer.

21. The method of claim 20 wherein said photoresist is novolak-resin-based.

22. The method of claim 1 wherein said magnetic field is generated by other than a discharge through a flash lamp.

23. The method of claim 22 wherein said magnetic field is generated without the generation of light.

24. The method of claim 23 wherein said magnetic field is generated through by passing a current through an elongated electrical conductor.

25. The method of claim 24 wherein said electrical conductor is wound in a flat spiral and said substance is positioned generally in a plane spaced from said spiral.

26. The method of claim 25 wherein the windings of said spiral are circular.

27. The method of claim 24 wherein said electrical conductor is wound in a helix and said substance is moved through the interior of said helix.

28. The method of claim 1 wherein said substance is of a type in which the degree to which said chemical reaction is catalyzed is substantially greater when said substance is subjected to said combined electromagnetic radiation and magnetic field than when subjected only to electromagnetic radiation.

29. The method of claim 28 wherein said chemical reaction is polymerization.

30. The method of claim 1 wherein said magnetic field is generated by other than a discharge through a flat spiral flash lamp.

* * * * *